United States Patent [19]

Moran et al.

[11] Patent Number: 5,393,811

[45] Date of Patent: Feb. 28, 1995

[54] COMPOSITION AND METHOD FOR IMPROVING THE STORAGE STABILITY OF POLYMER MODIFIED ASPHALTS

[75] Inventors: Lyle E. Moran; Katherine L. Sokol, both of Sarnia, Canada

[73] Assignee: Exxon Research and Engineering Company, Florham Park, N.J.

[21] Appl. No.: 59,695

[22] Filed: May 10, 1993

Related U.S. Application Data

[63] Continuation-in-part of Ser. No. 708,536, May 31, 1991, abandoned.

[51] Int. Cl.[6] .................... C08L 95/00; C08L 23/24
[52] U.S. Cl. ........................ 524/71; 524/59; 524/64; 524/68; 524/69; 524/70; 524/705; 524/579; 524/487
[58] Field of Search ............... 524/59, 64, 68, 69, 524/70, 71, 705, 579, 487

[56] References Cited

U.S. PATENT DOCUMENTS

| | | | |
|---|---|---|---|
| 2,197,461 | 4/1940 | Anderson et al. | 524/71 |
| 3,459,695 | 8/1969 | Hedge et al. | 524/70 |
| 3,896,069 | 7/1975 | Kosaka et al. | 524/68 |
| 3,969,294 | 7/1976 | Papouchado | 524/68 |
| 4,032,491 | 6/1977 | Schoenke | 260/28 |
| 4,060,569 | 11/1977 | Woods et al. | 260/683 |
| 4,153,594 | 5/1979 | Wilson, Jr. | 260/31 |
| 4,282,127 | 8/1981 | Desgouilles | 524/68 |
| 4,385,142 | 5/1983 | Böhm et al. | 524/68 |
| 4,468,254 | 8/1984 | Yokoyama et al. | 524/62 |
| 4,878,950 | 11/1989 | Halasz et al. | 524/71 |
| 4,978,698 | 12/1990 | Woodhams | 524/70 |
| 5,002,987 | 3/1991 | Schulz | 524/71 |

FOREIGN PATENT DOCUMENTS

| | | | |
|---|---|---|---|
| 0315239 | 5/1989 | European Pat. Off. | 524/68 |
| 0883107 | 11/1981 | U.S.S.R. | 524/68 |

OTHER PUBLICATIONS

Encyclopedia Of Polymer Science And Engineering, vol. 8, pp. 423–433, John Wiley & Sons, (1987).

*Primary Examiner*—Paul R. Michl
*Assistant Examiner*—Andrew E. C. Merriam
*Attorney, Agent, or Firm*—James H. Takemoto

[57] ABSTRACT

This invention relates to a composition and method for improving the storage stability of an asphalt that contains a higher molecular weight polymer having a number average molecular weight of at least about 10,000 which comprises adding a storage stable improving amount of a polymerized alpha-olefin prepared from an alpha-olefin of the formula

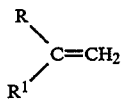

where R is $C_6$ to $C_{50}$ alkyl, $R^1$ is hydrogen or $C_6$ to $C_{50}$ alkyl, wherein the polymerized alpha-olefin has a number average molecular weight of from about 500 to 5,000 and is characterized in that it has a congealing and melting point which is essentially no higher than the congealing and melting point of the alpha-olefin from which it is prepared.

11 Claims, No Drawings

COMPOSITION AND METHOD FOR IMPROVING THE STORAGE STABILITY OF POLYMER MODIFIED ASPHALTS

This application is a continuation-in-part of U.S. Serial No. 708,536, filed May 31, 1991, now abandoned.

BACKGROUND OF THE INVENTION

1. Field of the Invention

This invention concerns a composition and method for improving the storage stability of a polymer modified asphalt by the addition of a polymerized alpha-olefin.

2. Discussion of Related Art

Asphalt is a bituminous material resulting from the distillation of crude oil. Typically, asphalt is derived from the bottoms of a vacuum distillation tower and has an atmospheric boiling point of at least 380° C. Because it is hydrophobic and has good adhesiveness and weatherability, asphalt has been used widely as a binder in paving materials and as a coating for roofing shingles.

Frequently, polymeric materials have been added to asphalt to enhance its theological properties, i.e., to improve its creep resistance above about 20° C. Polymer modified asphalts must also have good phase compatibility between the asphalt and polymer, and be storage stable at high temperatures for ease of handling and application. Compatibility between the polymer and asphalt is very important to ensure that the properties of both are transferred to the finished product for good long term performance. Poor storage stability will render the polymer modified asphalt unsuitable for use in paving binder applications, roofing applications, and other industrial specialty products. Accordingly, various methods have been suggested for maintaining storage stability.

One method requires continuous mixing of the asphalt/polymer mixture to avoid phase separation (See, for example, U.S. Pat. Nos. 4,240,946 and 4,314,921, which require high shear mixing to obtain physical dispersion of a polyolefin in bitumen. See also Transportation and Road Research Laboratory Report 1101 by J. H. Denning et. al., Highways and Structures Department, Crowthorne, Berkshire, England (1983)). Another method discloses adding one or more dispersants to a polyethylene modified asphalt to avoid phase separation (See Jew et al., Journal of Applied Polymer Science, 31, pp. 2685-2704 (1986)).

In yet another method, the composition of the asphalt is tailored to ensure compatibility with the polymer used or the polymer is selected to be compatible with the asphalt (See U.S. Pat. Nos. 4,868,233 and 4,873,275, the disclosures of which are incorporated herein by reference).

In still another method, polymer modified asphalt is stabilized by the addition of an acid after the polymer has been added to the asphalt (See, for example, German patent DE 22 55 173 C3 which discloses stabilizing mixtures of asphalt and styrenic thermoplastic elastomers (styrene-butadiene-styrene) by adding small amounts of 85% o-phosphoric acid or 36% hydrochloric acid to the asphalt/SBS mixture). Recently, U.S. Ser. No. 397,215 filed Aug. 23, 1989, discloses that the storage stability of acid treated polymer modified asphalts can be improved if the acid is added to the asphalt before the polymer. More recently, U.S. Ser. No. 517,776 filed May 2, 1990, discloses that the storage stability of acid treated polymer modified asphalts can be further improved if a branched, rather than a non-branched, polymer is added to the asphalt.

However, none of these methods, alone or in combination, disclose that the storage stability of a polymer modified asphalt can be improved if a polymerized alpha-olefin is also added to the asphalt.

SUMMARY OF THE INVENTION

This invention relates to a composition and method for improving the storage stability of an asphalt that contains a higher molecular weight polymer having a number average molecular weight of at least about 10,000 which comprises adding a storage stable improving amount of a polymerized alpha-olefin prepared from an alpha-olefin of the formula

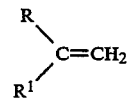

where R is $C_6$ to $C_{50}$ alkyl, $R^1$ is hydrogen or $C_6$ to $C_{50}$ alkyl, wherein the polymerized alpha-olefin has a number average molecular weight of from about 500 to 5,000 and is characterized in that it has a congealing and melting point which is essentially no higher than the congealing and melting point of the alpha-olefin from which it is prepared. The resulting polymer modified asphalt has enhanced storage stability relative to that obtained had the polymerized alpha-olefin not been added.

DETAILED DESCRIPTION OF THE INVENTION

This invention requires an asphalt, a polymerized alpha-olefin, and a polymer having a higher molecular weight than the polymerized alpha-olefin. The higher molecular weight polymer improves the rheological and engineering properties of the asphalt while the polymerized alpha-olefin imparts storage stability to the polymer modified asphalt.

The asphalt used in this invention may be obtained from a variety of sources including straight-run vacuum residue; mixtures of vacuum residue with diluents such as vacuum tower wash oil, paraffin distillate, aromatic and naphthenic oils, and mixtures thereof; oxidized vacuum residues or oxidized mixtures of vacuum residues and diluent oils; and the like. Other asphaltic materials such as coal tar pitch, rock asphalt, and naturally occurring asphalt may also be used. Typically, the asphalt will have an atmospheric boiling point of at least 380° C., more typically of at least 440° C., and an asphaltene content of between about 5 and about 30 wt. % as determined by ASTM D4124. In paving binder applications, the asphalt will typically comprise 85, preferably 90, wt. % or more of the polymer modified product (i.e., the final product). The asphalt will typically comprise 80, preferably 85, wt. % or more of the final product when it is used in roofing applications.

The polymerized alpha-olefin used in this invention is also known as an olefin derived hydrocarbon polymer or catalytically polymerized alpha-olefin. This polymer should have a relatively low molecular weight, e.g. a number average molecular weight of 5000 or less, preferably of about 3500 or less, and most preferably at about 3000 or less. Typically, the number average molecular weight will range from about 500 to 5000, preferably from about 750 to about 3500, and most preferably from about 1000 to about 3000.

The polymerized alpha-olefins are prepared from alpha-olefins having the formula

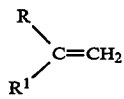

where R is $C_6$ to $C_{50}$ alkyl, preferably $C_{18}$-$C_{40}$ alkyl and $R^1$ is hydrogen or $C_6$ to $C_{50}$ alkyl, preferably hydrogen. The polymerization process is described in U.S. Pat. No. 4,060,569 which is incorporated herein by reference. The alpha-olefin is polymerized in the presence of a free radical catalyst. The nature of the free radical catalyst is not critical. Typical free radical catalysts include peroxides and hydroperoxides. The molar ratio of free radical catalyst to alpha-olefin is from about 0.005 to 0.35. A convenient measure of the effective presence of a free radical catalyst is its half-life which is employed as a measure of reaction time based on the number of half-lives. In general, reaction times of from about 1 to 20 half-lives are suitable. The polymerization is carried out at low pressures. The only pressure needed is that necessary to prevent vaporization of the free radical or alpha-olefin. Such pressures are typically less than about 500 psig. The polymerization temperature is typically set such that the free radical catalyst would have a half-life between 0.5 and 3 hours. This in turn is a function of the temperature at which the free radical catalyst decomposes. For peroxides and hydroperoxides, such temperatures are generally in a range from about 40° to 250° C. The reaction temperature employed will depend on the decomposition temperature of the particular peroxide or hydroperoxide used as catalyst.

The polymerized alpha-olefins are characterized in that they have higher viscosities and greater hardness but lower melting and congealing points than the alpha-olefins from which they are derived. This is in contrast to typical hydrocarbon polymers which have higher viscosities and greater hardness but also higher melting and congealing points than the hydrocarbon monomers from which they are derived. Because of their relatively low molecular weights, the polymerized alpha-olefins are also known as polymeric waxes or polymerized alpha-olefin waxes.

The polymerized alpha-olefins are commercially available. Suitable polymerized alpha-olefins are available from the Bareco Division of Petrolite Corporation under the registered trademark Vybar, which is available in solid (e.g. Vybar 103, Vybar 260) or liquid (e.g. Vybar 825) form. The use of the polymerized alpha-olefin in solid rather than liquid form is preferred.

The other polymer used in this invention should have a molecular weight greater than that of the polymerized alpha-olefin. In general, the number average molecular weight of the higher molecular weight polymer will be at least 10,000. Typically, the number average molecular weight will range from 10,000 to about 500,000, preferably from about 20,000 to about 300,000. Suitable polymers include thermosets (as defined by ASTM D 883-69 Standard Definitions of Terms Relating to Plastics, the disclosure of which is incorporated herein by reference) and thermoplastics (as defined by a modification of ASTM D 883-69). ASTM D 883-69 defines a thermoplastic as a polymer that can be repeatedly softened when heated and hardened when cooled. However, as used herein "thermoplastic polymer" is defined as in ASTM D 883-69 except that uncured polymers (such as uncured ethylene-propylene-diene terpolymers and uncured thermoplastic styrenic elastomers) are excluded. A thermoset is defined by ASTM D 883-69 as a polymer that can be changed into a substantially infusible or insoluble product when cured by heat or by chemical means. The polymer may be branched or linear.

Examples of suitable thermoplastics include acetals (e.g., polymers and copolymers of formaldehyde), acrylics, acrylonitrile-butadiene-styrene plastics, cellulosics (such as cellulose acetate, propionate and acetate-butyrate), chlorinated polyethylene, fluorocarbons, nylon, polycarbonates, polyethylenes, polyphenylene oxides, polyphenylene sulfides, polypropylene, polystryene, polysulfone, polyvinyl acetates, polyvinyl alcohols, polyvinyl chlorides, polyvinylidine chloride, styrene-acrylonitrile plastics, saturated polyesters, and thermoplastic elastomers of all classes including urethanes, polyesters, styrenics and olefinics. Preferred thermoplastics are polyethylene, ethylene methacrylate, ethylene-propylene elastomer, ethylene-vinyl acetate, nylon, or mixtures thereof, with ethylene methacrylate, ethylene-vinyl acetate, or their mixtures being particularly preferred. Ethylene-vinyl acetate is most preferred.

Examples of suitable thermosets include amino resins (e.g., melamine-formaldehyde, urea-formaldehyde, and mixtures thereof), phenolics, polyimides, polyurethanes, polysulfides, silicone rubbers, unsaturated polyesters, and vulcanized (i.e., cured) rubbers (e.g., natural rubbers and cured elastomers such as ethylene-propylene-diene terpolymers and styrene-butadiene-styrene block copolymers). Preferred thermosets are polyimides, polyurethanes, vulcanized rubbers, or their mixtures. Most preferred are polyurethanes, cured elastomers, or their mixtures.

The higher molecular weight polymer also includes derivatized analogues such as polymers grafted with maleic anhydride (e.g. ethylene vinyl acetate-maleic anhydride) or polymers grafted with sulfur or chlorine (e.g. sulfonated polyethylene, chlorinated polyethylene, and the like).

The particular higher molecular weight polymers used may be readily obtained in the marketplace from various chemical suppliers. Accordingly, their methods of preparation are well known to those skilled in the art (See Encyclopedia of Polymer Science and Technology, Interscience Publishers, New York (1971); Kirk-Othmer Encyclopedia of Chemical Technology, Wiley-Interscience, 3rd Ed., New York (1981); G. L. Kinney, Engineering Properties and Applications of Plastics, John Wiley & Sons, New York (1957); and Plastics in Building, edited by Irving Skeist, Reinhold Publishing Corporation, New York (1966), the disclosures of which are incorporated herein by reference).

The precise amount of higher molecular weight polymer added to the asphalt will vary with the particular asphalt used as well as with the amount and particular polymerized alpha-olefin used. Typically, however, the amount will range from about 1 to about 20 wt. % or more, based on the weight of the asphalt. Preferably, the amount of this polymer will range from about 1.5 to about 20 wt. %, more preferably from about 2 to about 15 wt. %.

Similarly, the amount of polymerized alpha-olefin added to the asphalt is not critical and will vary with the particular asphalt and higher molecular weight polymer used. In general, only a storage stability improving amount of the polymerized alpha-olefin need be added to improve the storage stability of a polymer modified asphalt. In practice, however, improved storage stability can usually be obtained by adding the polymerized alpha-olefin in an amount of 10 wt. % or less (typically, between about 0.025 and about 10 wt. %), based on weight of the asphalt. Directionally, however, greater amounts of the polymerized alpha-olefin will be required for higher asphaltene content asphalts than for lower asphaltene content asphalts. For example, for asphalts having an asphaltene content of 10 wt. % more (based on weight of the asphalt), the amount of polymerized alphaolefin required will range from about 1 to about 10 wt. %, preferably from about 1 to about 8 wt. %, more preferably from about 2 to about 6 wt. %, and most preferably from about 3 to about 5 wt. %. For asphalts having an asphaltene content of less than 10 wt. %, the amount of polymerized alpha-olefin required will range from about 0.025 to about 2 wt. %, preferably from about 0.05 to about 1.5 wt. %, more preferably from about 0.05 to about 1 wt. %, and most preferably from about 0.1 to about 0.4 wt. %.

When used as a paving binder, the resulting polymer modified asphalt of this invention will normally contain from about 3 (preferably 4) to about 8 wt. % total polymer. When used for roofing applications, the polymer modified asphalt will normally contain from about 8 to about 20 wt. % (preferably 15 wt. %) total polymer.

The precise conditions at which the polymers are added to the asphalt are not critical and will vary with the particular asphalt and polymers used. However, the conditions will normally be within the ranges typically used for adding polymers to asphalt in typical commercial operations. For example, polymers are usually added to an asphalt at a temperature of from about 150° to about 300° C., preferably from about 175° to about 230° C. Typically, the polymers will be added over a period of from about 1.5 to about 3 hours to ensure adequate dispersal. Although the polymers can be added over a longer period of time, it is important not to add them over too short a period because the polymers would not be properly dispersed in the asphalt. Once polymer addition is complete, the polymer modified asphalt is mixed for an additional 0.5 to 1.5 hours or more.

The asphalt may be mixed or blended with the polymers in any number of ways that can readily be selected by one skilled in the art. Suitable means include external mixers, roll mills, internal mixers, Banbury mixers, screw extruders, augers, and the like. Normally, the mixing or blending during polymer addition will be at ambient pressure. The order of polymer addition to the asphalt is not critical. As such, the polymers can be added together or separately and in any order.

If desired, an oxygen-containing gas (such as air) may be added (e.g. by air blowing) to the asphalt before, during, or after polymer addition. Similarly, an inorganic acid may also be added to the asphalt if desired.

The polymer modified asphalt product thus formed may be employed in essentially any application requiring asphalt-based products with superior storage stability. Examples of such applications include adhesives, coatings, fabricated products, road and roofing applications, sealants, sound and vibration dampening products, water proofing membranes and the like. However, the final product is particularly well suited for use as a paving binder, particularly a binder in the load bearing course as well as the top or surface course of hot mix pavement structures.

The present invention will be further understood by reference to the following examples, which disclose the best mode of practicing this invention. In the examples, the storage stability of the polymer modified asphalts tested was measured by placing a 200 gram sample in a copper tube (10 inches high and 1 inch in diameter) and heating it to 160° C. for the reported number of days. Then the sample was removed from the tube and divided into top and bottom fractions. The viscosity of each fraction was measured at 135° C. and then used to calculate the ratio of the top to the bottom viscosity. A ratio of 1.0 is considered as optimum storage stability, with ratios above or below 1.0 representing mixtures that are increasingly less storage stable. Accordingly, a ratio of 0.9 to 1.1 is preferred, a ratio of 0.8 to 0.9 and 1.1 to 1.2 is borderline but acceptable, and a ratio of less than 0.8 or more than 1.2 is a failure and unacceptable.

EXAMPLE 1

Polymerized Alpha-Olefin Improves Storage Stability of Polymer Modified Asphalt

Tests were performed on two samples of a 269 penetration straight-run asphalt obtained from vacuum distillation. A polymerized alpha-olefin (Vybar 103) was added to the asphalt sample first, followed directly by addition of an ethylene-vinyl acetate copolymer, which was added over approximately a two to three minute period. The Vybar 103 had a number average molecular weight of about 2800, while the EVA copolymer had a Melt Index of 10 g/10 mins (which corresponds to a number average molecular weight of approximately 26,000). The blend was then mixed for from about one to about two hours. The temperature of the sample ranged between 190° C. and 200° C. at all times during the tests. The asphalt was stirred during the addition of both polymers. The properties of the samples tested were then determined and the results shown in Table 1.

TABLE 1

| Sample No. | 1 | 2 |
|---|---|---|
| Feedstock Inspections | | |
| Polymerized Alpha-Olefin (Vybar 103), wt. % | 0.0 | 1.0 |
| Ethylene-Vinyl Acetate, wt. % | 5 | |
| Melt Index, g/10 mins. | 10 | |
| Vinyl Acetate, wt. % | 12 | |
| Asphalt, wt. % | 95 | 94 |
| Penetration at 25° C., mm/10 | 269 | |
| Asphaltenes, wt. % | −8 | |
| Product Inspections | | |
| Softening Point, °C. | 61 | 63 |
| Penetration at 25° C., mm/10 | 98 | 83 |
| Viscosity | | |
| at 60° C., Pa · S | 326 | 582 |
| at 135° C., cSt | 745 | 956 |
| Storage Stability at 160° C. | | |
| 7 days | 0.9 | 1.0 |
| 28 days | 1.5 | 1.0 |

The data in Table 1 show that a low asphaltene polymer modified asphalt containing a polymerized alphaolefin has better storage stability after 28 days than does the asphalt without the polymerized alpha-olefin.

EXAMPLE 2

Polymerized Alpha-Olefin Improves Storage Stability of Polymer Modified Asphalt

Example 1 was repeated except that two different EVA copolymers used. The polymers used had a Melt Index of 2 and 11.8 g/10 mins (which corresponds to number average molecular weights of approximately 32,000 and approximately 25,500, respectively). The properties of the samples tested were then determined and the results shown in Table 2.

TABLE 2

| Sample No. | 1 | 2 |
|---|---|---|
| Feedstock Inspections | | |
| Polymerized Alpha-Olefin (Vybar 103), wt % | 0.0 | 0.25 |
| Ethylene-Vinyl Acetate, wt. % | 2 | |
| Melt Index, g/10 mins. | 2 | |
| Vinyl Acetate, wt. % | 9 | |
| Ethylene-Vinyl Acetate, wt. % | 3 | |
| Melt Index, g/10 mins. | 11.8 | |
| Vinyl Acetate, wt. % | 18 | |
| Asphalt, wt. % | 95 | 94.75 |
| Penetration at 25° C., mm/10 | 269 | |
| Asphaltenes, wt. % | −8 | |
| Product Inspections | | |
| Softening Point, °C. | 62 | 63 |
| Penetration at 25° C., mm/10 | 91 | 82 |
| Viscosity | | |
| at 60° C., Pa · S | 9940 | 8740 |
| at 135° C., cSt | 941 | 1090 |
| Storage Stability at 160° C. | | |
| 7 days | 1.4 | 1.0 |
| 14 days | 2.3 | 1.0 |
| 21 days | — | 1.1 |
| 28 days | — | 1.2 |

The data in Table 2 show that the addition of a polymerized alpha-olefin improves the storage stability of a polymer modified asphalt containing a blend of two different EVAs and having an asphaltene content of about 8 wt. %.

EXAMPLE 3

Polymerized Alpha-Olefin Improves Storage Stability of Polymer Modified Asphalt

Example 1 was repeated using a 300/400 penetration straight-run higher asphaltene content asphalt obtained from vacuum distillation. The properties of the samples tested were then determined and the results shown in Table 3.

TABLE 3

| Sample No. | 1 | 2 |
|---|---|---|
| Feedstock Inspections | | |
| Polymerized Alpha-Olefin (Vybar 103), wt % | 0.0 | 5 |
| Ethylene-Vinyl Acetate, wt. % | | 5 |
| Melt Index, g/10 mins. | | 10 |
| Vinyl Acetate, wt. % | | 12 |
| Asphalt, wt. % | 95 | 90 |
| Penetration at 25° C., mm/10 | 300/400 | |
| Asphaltenes, wt. % | −15 | |
| Product Inspections | | |
| Softening Point, °C. | 49 | 70 |
| Penetration at 25° C., mm/10 | 122 | 101 |
| Storage Stability at 160° C. | | |
| 5 days | 2.9 | 0.8 |
| 28 days | — | 1.1 |

The data in Table 3 show that a polymerized alpha-olefin improves the storage stability of a polymer modified asphalt having an asphaltene content of about 15 wt. %.

EXAMPLE 4

Small Amounts of Polymerized Alpha-Olefin Improve Storage Stability

Following the procedure of Example 1, various amounts of a polymerized alpha-olefin were added to several samples of the same 300/400 penetration straight-run polymer modified asphalt obtained from vacuum distillation. The properties of the samples tested were then determined and the results shown in Table 4.

TABLE 4

| Sample No. | 1 | 2 | 3 | 4 | 5 | 6 | 7 |
|---|---|---|---|---|---|---|---|
| Feedstock Inspections | | | | | | | |
| Polymerized Alpha-Olefin (Vybar 103), wt % | 1 | 0.75 | 0.5 | 0.25 | 0.1 | 0.05 | 0 |
| Ethylene-Vinyl Acetate, wt. % | | | | 5 | | | |
| Melt Index | | | | 10 | | | |
| Vinyl Acetate, wt. % | | | | 12 | | | |
| Asphalt, wt. % | 94 | 94.25 | 94.5 | 94.75 | 94.9 | 94.95 | 95 |
| Penetration at 25° C., mm/10 | | | | 300/400 | | | |
| Asphaltenes, wt. % | | | | −8 | | | |
| Product Inspections | | | | | | | |
| Softening Point, °C. | 63 | 69 | 56 | 56 | 55 | 56 | 55 |
| Penetration at 25° C., mm/10 | 83 | 82 | 92 | 87 | 99 | 91 | 92 |
| Viscosity at 135° C., cSt | 956 | 990 | 992 | 1001 | 982 | — | 1050 |
| Storage Stability at 160° C. | | | | | | | |
| 7 days | 0.7 | 0.8 | 1.0 | 1.0 | 1.1 | 1.0 | 1.2 |
| 28 days | 1.0 | 0.8 | 1.1 | 1.1 | 1.2 | 1.0 | 1.6 |

The data in Table 4 show that very small amounts of a polymerized alpha-olefin are effective in improving the storage stability of a polymer modified asphalt after 7 days.

EXAMPLE 5

Polymerized Alpha-Olefin Can Be Added Before, With, or After Other Polymers

Tests were performed on four samples of the same 300/400 penetration straight-run asphalt used in Example 4. A polymerized alpha-olefin (Vybar 103) and ethylene-vinyl acetate (EVA) polymer, each alone or in combination, were added to the samples. The temperature of the samples ranged between 190° and 200° C. at all times during the tests. The order and conditions of adding the polymers were varied as follows:

When addition of the polymerized alpha-olefin preceded addition of the EVA polymer, the former was added to the asphalt over about a two to three minute period and the mixture mixed for approximately a twenty minute period followed by reaction with the asphalt for about an additional thirty minutes. The EVA polymer was then added over approximately a two to three minute period and mixed with the polymerized alpha-olefin containing asphalt for from about one to about two hours.

When EVA polymer addition preceded addition of the polymerized alpha-olefin, the EVA polymer was added to the asphalt over from about two to about three minutes and the mixture mixed for from about one to about two hours. The polymerized alpha-olefin was then added over about a two to three minute period and the mixture mixed for approximately a twenty minute period followed by reaction with the EVA polymer modified asphalt for about an additional thirty minutes.

When the polymerized alpha-olefin and EVA polymer were added together, both were added over about a five minute period and then mixed with the asphalt for an additional hour and a half.

The properties of the samples tested were determined and the results shown in Table 5.

TABLE 5

| Sample No. | 1<br>EVA Modified<br>Asphalt | 2<br>α-Olefin Polymer<br>Added First | 3<br>EVA Polymer<br>Added First | 4<br>Both Polymers<br>Added Together |
|---|---|---|---|---|
| Feedstock Inspections | | | | |
| Polymerized Alpha-Olefin (Vybar 103), wt. % | 0 | | 0.25 | |
| Ethylene-Vinyl Acetate, wt. % | | 5 | | |
| Melt Index | | 10 | | |
| Vinyl Acetate, wt. % | | 12 | | |
| Asphalt, wt. % | 95 | | 94.75 | |
| Penetration at 25° C., mm/10 | | 300/400 | | |
| Asphaltenes, wt. % | | −8 | | |
| Product Inspections | | | | |
| Penetration at 25° C., mm/10 | 92 | 82 | 86 | 108 |
| Viscosity at 135° C., cSt | 1050 | 1090 | 1079 | 1106 |
| Storage Stability at 160° C. | | | | |
| 7 days | 1.2 | 1.0 | 1.0 | 1.1 |
| 28 days | 1.6 | 1.2 | 1.0 | 1.1 |

The data in Table 5 show that the order in which the polymerized alpha-olefin and higher molecular weight polymer are added to the asphalt is not critical. Accordingly, the storage stability of a polymer modified asphalt can be improved by adding a polymerized alpha-olefin before, with, or after the higher molecular weight polymer.

What is claimed is:

1. A method for improving the storage stability of an asphalt consisting of asphalt and a thermoplastic polymer selected from the group consisting of polyethylene, ethylene methacrylate, ethylene-propylene elastomer, ethylene-vinyl acetate, nylon, and mixtures thereof, or a thermoset polymer selected from the group consisting of polyimide, polyurethane, vulcanized rubber, cured elastomer and mixtures thereof, wherein said thermoplastic or thermoset polymers have a number average molecular weight of at least 10,000 which consists of adding a storage stability improving amount of a polymerized alpha-olefin prepared from an alpha-olefin of the formula

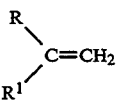

where R is $C_{18}$ to $C_{40}$ alkyl and $R^1$ is hydrogen, wherein the polymerized alpha-olefin has a number averaged molecular weight of form about 500 to 5,000 and has a congealing and melting point which is essentially no higher than the congealing and melting point of the alpha-olefin from which it is prepared.

2. The method of claim 1 wherein the polymerized alpha-olefin is added to the asphalt in an amount of about 0.025 to about 10 wt. % based on asphalt.

3. The method of claim 2 wherein from about 1.0 to about 20 wt. % based on asphalt, polymer is added in the asphalt.

4. The method of claim 3 wherein the asphalt has an asphaltene content of at least 10 wt. % and the amount of polymerized alpha-olefin added ranges from about 1 to about 8 wt. % based on asphalt.

5. The method of claim 3 wherein the asphalt has an asphaltene content of less than 10 wt. % and the amount of polymerized alpha-olefin added ranges from about 0.025 to about 2 wt. % based on asphalt.

6. A storage stable asphaltic composition consisting of asphalt, from about 1 to about 20 wt % of a thermoplastic polymer selected from the group consisting of polyethylene, ethylene methacryalate, ethylenepropylene elastomer, ethylene-vinyl acetate, nylon and mixtures thereof, a thermoset polymer selected from the group consisting of polyimide, polyurethane, vulcanized rubber, cured elastomer and mixtures thereof, or a mixture thereof, wherein said thermoplastic or thermoset polymers have a number average molecular weight of at least 10,000 and from about 0,025 to about 10 wt % of a polymerized alpha-olefin prepared from an alpha-olefin of the formula

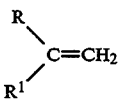

where R is $C_{18}$ to $C_{40}$ alkyl and $R^1$ is hydrogen, wherein the polymerized alpha-olefin has a number average molecular weight of from about 500 to 5,000 and has a congealing and melting point which is essentially no higher than the congealing and melting point of the alpha-olefin from which it is prepared.

7. The composition of claim 6 wherein from about 1 to about 8 wt. % based on asphalt of the polymerized alpha-olefin is added to asphalt having an asphaltene content of at least 10 wt. % based on asphalt.

8. The composition of claim 7 wherein the thermoplastic polymer is ethylene methacrylate, ethylene-vinyl acetate, or their mixtures.

9. The composition of claim 6 wherein from about 0.025 to about 2 wt. % based on asphalt of the polymerized alpha-olefin is added to asphalt having an asphaltene content of less than 10 wt. % based on asphalt.

10. The composition of claim 9 wherein the thermoplastic polymer is ethylene methacrylate, ethylene-vinyl acetate, or their mixtures.

11. The composition of claim 6 wherein the polymer modified asphalt contains at least 80 wt. % asphalt and from about 8 to about 20 wt. % total polymer.

* * * * *